United States Patent
Erdler et al.

(10) Patent No.: US 7,422,816 B2
(45) Date of Patent: Sep. 9, 2008

(54) FUEL CELL SYSTEM

(75) Inventors: Gilbert Erdler, Freiburg (DE); Mirko Lehmann, Freiburg (DE); Class Müller, Freiburg (DE)

(73) Assignees: Micronas GmbH, Freiburg (DE); Albert-Ludwigs-Universitat Freiburg, Freiburg (DE)

( * ) Notice: Subject to any disclaimer, the term of this patent is extended or adjusted under 35 U.S.C. 154(b) by 241 days.

(21) Appl. No.: 11/074,594

(22) Filed: Mar. 8, 2005

(65) Prior Publication Data

US 2005/0244701 A1 Nov. 3, 2005

(30) Foreign Application Priority Data

Mar. 8, 2004 (DE) .................. 10 2004 011 554

(51) Int. Cl.
*H01M 2/00* (2006.01)
(52) U.S. Cl. ........................................ 429/34
(58) Field of Classification Search ............ 429/34, 429/30, 21
See application file for complete search history.

(56) References Cited

U.S. PATENT DOCUMENTS

| | | | |
|---|---|---|---|
| 3,338,746 A | 8/1967 | Plust et al. ................. 429/9 |
| 3,400,305 A | 9/1968 | Coffman .................... 361/434 |
| 4,164,172 A | 8/1979 | Anderten et al. ............ 98/33 R |
| 6,028,414 A | 2/2000 | Chouinard et al. .......... 320/110 |
| 6,057,051 A | 5/2000 | Uchida et al. ............... 429/19 |
| 6,160,278 A | 12/2000 | Liu et al. .................... 257/252 |
| 6,312,846 B1 | 11/2001 | Marsh ........................ 429/30 |
| 6,326,097 B1 | 12/2001 | Hockaday ................... 429/34 |
| 6,506,511 B1 | 1/2003 | Lakeman et al. ........... 429/31 |
| 2001/0016283 A1 | 8/2001 | Shiraishi et al. ........... 429/218.1 |
| 2001/0033959 A1 | 10/2001 | Ovshinsky et al. .......... 429/40 |
| 2002/0098399 A1 | 7/2002 | Keppeler .................... 429/19 |
| 2003/0003347 A1 | 1/2003 | D'Arrigo et al. ............ 429/44 |
| 2003/0157389 A1 | 8/2003 | Kornmayer .................. 429/34 |
| 2003/0170520 A1 | 9/2003 | Fujii et al. .................. 429/32 |
| 2006/0127716 A1* | 6/2006 | Lehmann .................... 429/19 |

FOREIGN PATENT DOCUMENTS

| | | |
|---|---|---|
| DE | 19908532 | 4/2000 |
| DE | 102 55 736 | 6/2004 |
| EP | 1 037 183 | 9/2000 |
| WO | WO 01/69228 | 9/2001 |
| WO | WO 02/030810 | 4/2003 |
| WO | WO 2005/008824 | 1/2005 |

* cited by examiner

*Primary Examiner*—Patrick Ryan
*Assistant Examiner*—Thomas H. Parsons
(74) *Attorney, Agent, or Firm*—O'Shea Getz P.C.

(57) ABSTRACT

A fuel cell system includes a fuel cell and a fuel infeed device. The fuel cell has first and second electrodes (cathode and anode). A layer with catalytic activity permeable to protons is between the electrodes. A fuel supply device provides a fuel, and a reactant supply device provides a reactant that reacts with protons from the fuel to produce current. The fuel and reactant supply devices are located directly on the face of an electrode. The fuel infeed device is connected to the fuel supply device for feeding in the fuel, the fuel supply device being one of the electrodes. The fuel supply device also stores the fuel. Besides supplying an electrical circuit with the fuel cell system as a micro energy supply device, the fuel cell system as a fuel infeed device also has an integrated electrolysis unit for regenerating the fuel supply.

17 Claims, 5 Drawing Sheets

FUEL CELL SYSTEM

PRIORITY INFORMATION

This application claims priority from German application DE 10 2004 011 554.0 filed Mar. 8, 2004, which is hereby incorporated by reference.

BACKGROUND OF THE INVENTION

The present invention relates to the field of fuel cells, and in particular to a fuel cell for the autonomous operation of an integrated circuit.

Electrical power for electrically operated devices is generally supplied by external energy sources. The external energy sources typically include line power (e.g., 120 VAC) or batteries.

Fuel cell systems can also be used instead of batteries. Fuel cells typically include a first and a second electrode system, one of which functions as the anode and the other as the cathode. A membrane-electrode unit (MEU) of a catalytic nature with a catalytic coating that serves as a proton-permeable membrane is located between the electrodes. Such a fuel cell also has a fuel supply device for the fuel, typically hydrogen, and a reactant supply device that provides a reactant. The reactant reacts with protons that originate from the fuel and have passed through the membrane, to produce current.

U.S. Pat. No. 6,312,846 discloses a fuel cell formed on a semiconductor wafer, with conduits made in the wafer as conductors for the fuel and the reactant, with a membrane between the conduits that permits proton interchange. A drawback with such a system is that a separate reservoir for the fuel, connected to the conduit conducting the fuel, also has to be made available.

U.S. Pat. No. 6,326,097 discloses a system that is designed for recharging storage batteries, for example of a mobile radio. This system includes a mount with an electrical connection for the apparatus to be supplied with current, a fuel cell system to produce the current and a fuel supply device to feed fuel to the fuel cell system. The fuel supply device in this case includes a receptacle for hydrogen storage cartridges, which can be replaced after consumption of the fuel. Such systems are relatively expensive and are practical for producing larger amounts of current, such as those needed for example for mobile radios.

Fuel cell systems are also known that have a fuel cell, a fuel supply device and a fuel infeed device that provides the fuel from the fuel supply device to the fuel cell.

Hydrogen gas is considered the optimal energy carrier because of its very high energy content and its combustion to water completely without residue. Biological hydrogen production is being discussed increasingly, in addition to its preparation from fossil fuels and from water by electrolysis, which can be done in an environmentally friendly manner using energy from solar cells. In particular, many algae and bacteria are able to produce molecular hydrogen under certain conditions. The energy needed for this, as in the case of solar cells, is taken directly from sunlight, in this case by the photosynthesis of these organisms.

There is a need for a smaller fuel cell system of simpler construction.

SUMMARY OF THE INVENTION

A fuel cell is equipped with a first electrode and a second electrode, one of which acts as the cathode and the other as the anode. The fuel cell also includes a catalytic material that is located between the first electrode and the second electrode, a fuel supply device and a reactant supply device. The fuel supply device and the reactant supply device are located on the first electrode and the face of the second electrode, respectively.

The fuel infeed device is connected to the fuel supply device to feed in the fuel, and the fuel supply device is designed as one of the electrodes, or the fuel supply device is produced as a layer adjacent to one of the electrodes. If the fuel supply device is designed as a hydrogen reservoir made of palladium, then no platinum is needed as a catalyst between the membrane and palladium, which leads to cost savings.

Such a fuel cell system is of compact construction and permits miniaturization into a micro energy supply device for providing a limited amount of current for an integrated circuit arrangement or for other purposes with low current needs. The amount of current that can be produced is determined by the amount of fuel that is stored in the fuel supply device. Commercial buffer batteries, storage batteries, or for example "goldcap" capacitors are replaced by the fuel cell system and the method. The fuel supply device can again be refilled with fuel by coupling to a fuel infeed device.

The system of the present invention is particularly advantageous in circuits that require a limited amount of current only briefly, for example in case of a momentary failure of a main power supply from an external power supply device. Such fuel cell systems permit subsequent regeneration of the fuel reservoir or of the fuel supply device by again feeding in fuel.

A fuel cell system is preferred in which the fuel infeed device and the fuel supply device are positioned adjacent to one another and form an electrolysis cell. Such an arrangement provides a relatively compact construction. Especially compact and simple construction is achieved with a fuel cell system in which the fuel supply device is designed as one of the electrodes of the fuel cell or is located directly adjacent to one of the electrodes, as one electrode of an electrolysis cell made up of the fuel infeed device or is located directly adjacent to an electrode made up of the fuel infeed device. In such a system, the fuel supply device functions as a reservoir for supplying the fuel for the fuel cell in the immediate vicinity of the fuel cell, and as a reservoir for storing fuel produced by the electrolysis cell. In one embodiment, the fuel supply device is an electrode of the fuel cell and/or an electrode of the electrolysis cell.

Especially preferred is a fuel cell system with integrated storage devices for a combustion product, the fuel, and the reactant, as a closed system. Thus all of the operating elements necessary for producing current (i.e., the fuel, particularly hydrogen, as well as the reactant, particularly oxygen) for autonomous operation are provided. A storage device for a combustion product, particularly water, is preferably also produced so that disposal of the combustion product, if incorporated into a circuit system or the like that is sensitive to free water, is non-critical.

If the fuel infeed device is made as an electrolysis unit, the storage device with the combustion product can be used also as the infeed device of the electrolysis starting material for the electrolysis process. Such an arrangement is especially advantageous for the fuel cell system if the storage devices for the reactant and for the combustion product are connected to one another as a common container for interchange and passage of reactant and combustion product. Especially advantageous in this embodiment is a fuel cell system in which the storage device for the reactant is placed adjacent to one of the electrodes of the fuel cell and the storage device for the combustion product is placed adjacent to an electrode of an electrolysis unit. The storage device for the reactant may include a hydrophobic material and/or the storage device for the combustion product may include a hydrophilic material. The arrangement of these materials in the two storage devices not only causes acceleration of the reactant produced in the electrolysis unit when carried away to the region of the fuel cell, but also causes acceleration of the combustion product produced during combustion in the fuel cell when carried away to the region of the electrolysis unit.

The storage device for the fuel may be placed between the proton-permeable film of the fuel cell and an electrolyte layer of an electrolysis unit, and the fuel cell and the electrolysis unit may enclose the two other storage devices. Similarly, the reactant and the combustion product may be placed between the proton-permeable film of the fuel cell and an electrolyte layer of an electrolysis unit, and the other storage device encloses the fuel cell and the electrolysis unit. The fuel cell system may be essentially of symmetrical cylindrical construction. Such construction permits a space-saving arrangement of the individual components and thus miniaturization of the entire fuel cell system. This makes hermetically sealed construction possible, in which products and educts run in a closed loop.

The fuel cell system may include a switch for loading and unloading of the fuel supply device. The fuel infeed device is wired as a cathode by reverse switching of the fuel cell, for which the wiring is done appropriately for loading the fuel supply device. The fuel supply device or one of the electrodes adjacent to it is appropriately wired as a cathode. The subunit including the electrode, membrane or proton-permeable layer and the other electrode can be switched to be either a fuel cell or an electrolysis cell with such an arrangement. After the fuel is consumed, the fuel supply can be regenerated from the end product of combustion by introducing current from an external current source, with the entire system advantageously being designed as an autonomous system by making appropriate storage devices for the fuel, reactant, and combustion product.

The fuel supply device may be attached to a semiconductor layer as one of the electrodes or as a layer directly adjacent to one of the electrodes. The semiconductor layer facilitates integration into a semiconductor system. An integrated circuit system may be located on the other side of the semiconductor layer that is supplied with current by the fuel cell, or that performs active switching of the fuel cell system. Such an arrangement is particularly useful when the fuel infeed system can be positioned on the side of the fuel supply device or the fuel is fed through conduits into the semiconductor layer or into a layer located above it.

The fuel infeed device may include an electrolysis unit for producing the fuel. The fuel supply device may include a bonded material to which fuel is fed. The fuel supply device may include palladium and is designed as a palladium reservoir, especially as a palladium hydride reservoir. The fuel supply device may be configured for autonomous operation of an integrated circuit, for example with dimensions of 10 cm×10 cm×2 cm, or with special preference 1 cm×1 cm×0.2 cm. The fuel infeed device may include a depot with algae or bacteria for producing the fuel. The depot can be placed in the vicinity of the fuel supply device, in particular a palladium reservoir. Hydrogen is then produced with incident solar irradiation, which diffuses into and is stored in the palladium. It is advantageous here that this also functions during the operation of the fuel cell. In particular, no electrolysis voltage has to be applied, since the hydrogen is produced by the microorganisms. Biofuel cells have the advantage of being very small and also of functioning at room temperature.

The oxygen side may be provided with microorganisms, for example cells, algae, or bacteria, which produce oxygen by photosynthesis, for example. The oxygen is then utilized for the fuel cell reaction.

A micro energy supply device with such a fuel cell supplies relatively small amounts of current with a relatively small and limited amount of fuel. Significantly, this amount of fuel can be replenished autonomously.

Also advantageous is an integrated circuit (IC) arrangement with one side, particularly a finished processed front face of the IC surface, and such a fuel cell system for supplying energy to the integrated circuit arrangement, wherein the fuel supply device has palladium and is attached as a palladium reservoir, particularly as a palladium hydride reservoir, to this side or to this finished processed side of the IC surface. This reduces the space requirement of such an IC.

An embodiment in which the oxygen side is appropriately designed as a reservoir, for example as a reservoir for oxygen-saturated liquid or polymer, is also advantageous. Of course, an electrolysis cell that produces oxygen can also be attached suitably to the oxygen side of the system.

These and other objects, features and advantages of the present invention will become more apparent in light of the following detailed description of preferred embodiments thereof, as illustrated in the accompanying drawings.

DETAILED DESCRIPTION OF THE INVENTION

Figure 1A:
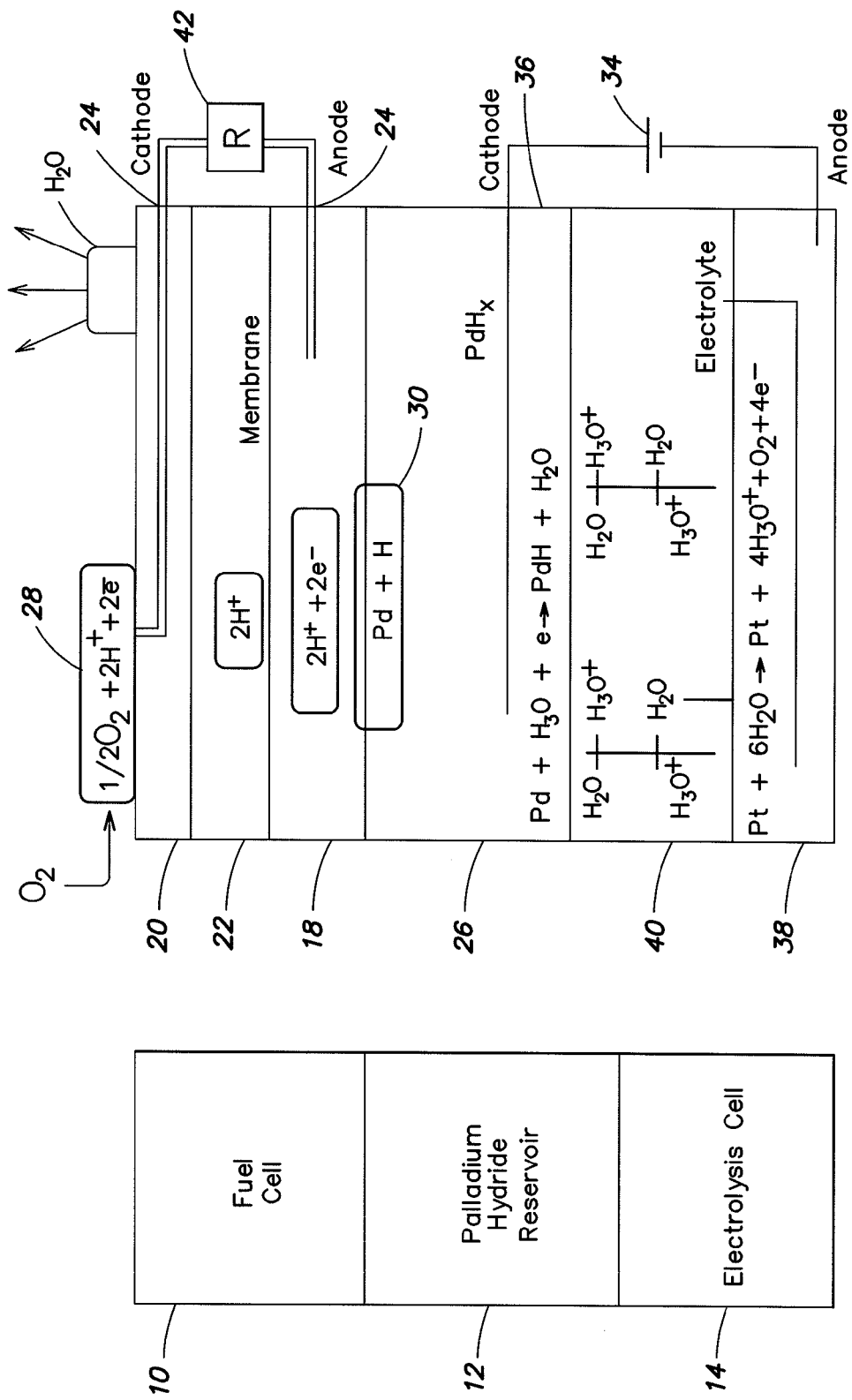
FIG. 1A is a simplified illustration of a fuel cell system.

The basic principle of a fuel cell system is outlined on the left side of FIG. 1A. The fuel cell system includes three primary components—a fuel cell 10, a fuel reservoir 12, and an electrolysis cell 14. The fuel supply device 12 may be made using palladium Pd and serves as a palladium reservoir or palladium hydride reservoir for the interim storage of hydrogen as fuel for the fuel cell 10.

Figure 1B:
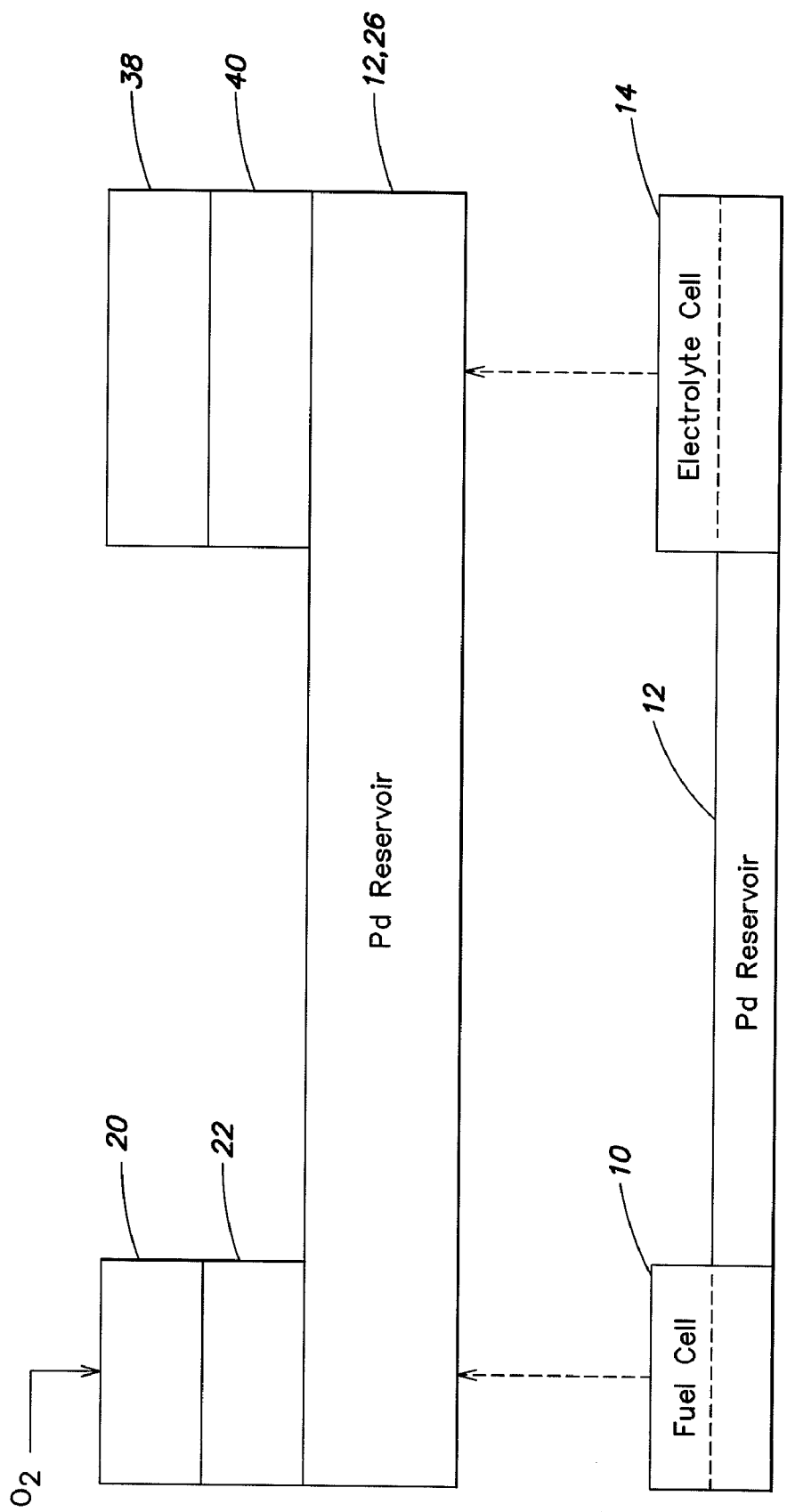
FIG. 1B is an illustration of a fuel cell system.

FIG. 1B shows an arrangement in which the fuel cell 10 and the electrolysis cell 14 are placed next to one another and share a common palladium reservoir 12. The palladium reservoir 12 extends along the bottom below the fuel cell 10 and below the electrolysis cell 14, and extends laterally between them as an element joining them. Hydrogen formed during electrolysis is distributed in the palladium by diffusion.

As shown in FIGS. 1A and 1B, the fuel cell includes a first electrode 18 and a second electrode 20. The two electrodes 18, 20 are made up at least of a layer 22 permeable to protons H, preferably in the form of a catalytic membrane. The electrodes 18, 20 are designed as the anode and cathode and have electrical connections 24. The first electrode 3 may be placed directly on a substrate 26, so that a direct connection can also be made to an appropriately conductive region of the substrate 26.

Fuel (e.g., hydrogen) enters from the side of the first electrode 18. The fuel reacts with the catalytic layer 22 or corresponding elements in the material of the first electrode 18 in such a way that hydrogen ions, in other words protons, are released. These protons pass through the proton-conducting layer 22 toward the second electrode 20. In the region of the second electrode 20, the protons react with a reactant fed into this region, preferably oxygen $O_2$. A corresponding current flow is produced through the electrical conductor 24 with this closed circuit.

As shown in FIG. 1A, the reactant $O_2$ from the environment can arrive directly at the freely accessible second electrode 20, so that as far as the reactant is concerned, operation is possible in any area with air containing oxygen. In the embodiment illustrated, the second electrode 20 includes a diffusion layer 28 that makes possible the entry and passage of the reactant $O_2$.

The fuel supply device 12 includes the first electrode 18 and/or, as shown, of another layer 26 adjacent to it. This first electrode 18 or the other layer contains fuel, preferably hydrogen. When needed, this fuel is emitted form the material of the first electrode or of the other layer.

Such a system actually appears disadvantageous at first glance since only a limited amount of fuel is available, but the structural benefit outweighs this because of its miniaturization, particularly with devices with only very slight and perhaps only one-time or periodic current demand, since no additional fuel infeed conduits or separate fuel reservoirs are necessary.

Manufacture of the fuel cell relatively simple, with the fuel supply device integrated in a semiconductor production process, for example in a CMOS process. In this process, during the production of the layer for making the first electrode 18 or of the other layer adjacent to it, a material supplied with the fuel is applied to a substrate layer. This may include the combination of bonded palladium (Pd) to which hydrogen is supplied during or after the deposition process. The membrane or the proton-permeable layer 22 and other materials and layers necessary for a fuel cell are then applied.

For example, a first electrode 18 may include a palladium layer 30 with an area of 1 mm$^2$ and with a thickness of 1 μm can be saturated with hydrogen during the production process. It is desirable to get by with this—hydrogen, that is to say to provide for no additional hydrogen infeed devices at all or any corresponding energy carrier. The oxygen is supplied by the ambient air. Semiconductor circuits can be supplied with this chip-integrated current source to provide an alarm system, for example, or a smart patch.

In the described example, initial calculations and depending on the hydrogen diffusion conditions, a ten-second flow of current of the order of magnitude of 1 μA can be produced by a single input of hydrogen. Simple semiconductor circuits or chips can be provided in this way with an integrated current source, for example to make an alarm system.

The top face of the substrate 26, that is, the surface facing the fuel cell, in an especially preferred embodiment (see, e.g., FIGS. 2A, 2B) includes polysilicon 31 with appropriate structuring and development of suitably doped regions. The polysilicon 31 constitutes a transition layer to an integrated circuit 32 (IC) beneath it, which is to be supplied with current from the fuel cell. In turn, beneath the polysilicon, it is a nitride as a diffusion barrier for the hydrogen. In particular, for space reasons, the palladium can also be applied to the back or the finished processed front face of the IC surface.

Particularly with the example of an alarm system, which in the ideal case is rarely if ever to be activated, the ability to replenish the fuel supply device 12 with new fuel is desirable.

To be able to avoid a structurally expensive system, one embodiment includes an integrated electrolysis cell. The electrolysis cell 14 that is operated by a photoelectric cell as a voltage source 34, for example, advantageously suffices for reloading the fuel in an alarm system. Water from the ambient air may be used as the starting material for the electrolysis process. When used outdoors, for example, water of condensation from morning dew can also be used as the starting material for the electrolysis process, in order to split the water $H_2O$ supplied in this way into oxygen $O_2$ and hydrogen after the sun rises, using current from the photoelectric cell. The oxygen is liberated directly. The hydrogen is fed as fuel to the fuel supply device.

In the system illustrated, the electrolysis cell 14 includes two electrolysis cell electrodes with connections to the voltage source 34. The electrolysis cell 14 is located between the first and second electrolysis electrodes 36, 38. The electrode 36 serves as the cathode and as a fuel reservoir and the fuel supply device. The fuel supply device in the structure illustrated, serves both as an anode-switched electrode of the fuel cell and as a cathode-switched electrode of the electrolysis cell.

Electrolysis of water is carried out to produce four molecules of $H_3O^+$ and free oxygen $O_2$ by the electrode 38 designed as an anode of the electrolysis cell 14 (water electrolysis), with the assistance of platinum Pt and six water molecules $H_2O$. During the electrolysis, palladium Pd and molecular $H_3O$ are available for the further reaction in the fuel supply device 12 in combination with free electrons $e^-$ on the other side of electrolysis layer 40, i.e. in the region of the electrode 36 serving as the cathode. A palladium-hydrogen compound PdH and water $H_2O$ are formed. After applying a load 42 to the electrodes 18, 20 of the fuel cell 10, protons $2H^+$ and free electrons 2 $e^-$ are formed by the catalyst of the membrane 22 of palladium Pd and hydrogen. The protons $2H^+$ traverse the membrane to the electrode 20 serving as the cathode, with water $H_2O$ being formed and released to the surrounding air, because of the catalytic action in combination with supplied oxygen $O_2$.

The construction facilitates miniaturization by the electrolysis cell being attached to the back of the palladium reservoir so that the palladium reservoir can be loaded reversibly and electrochemically with hydrogen from there.

Figure 2A:
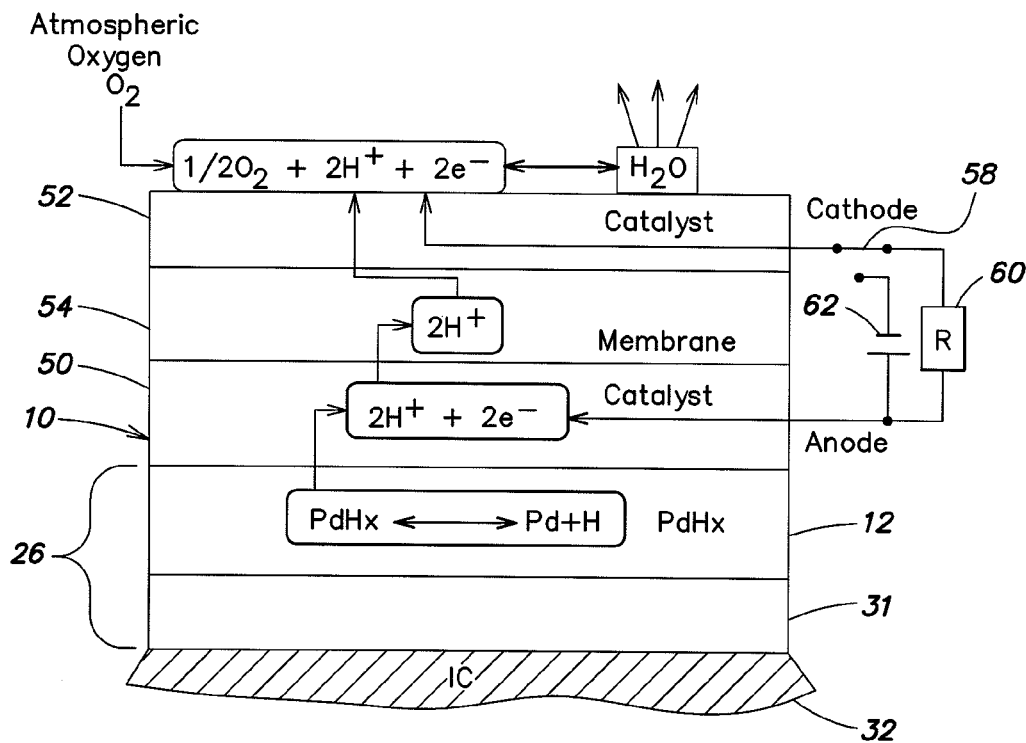
FIGS. 2A and 2B show an alternative embodiment in which a layered arrangement can be switched in as a fuel cell or an electrolysis cell.
Figure 2B:
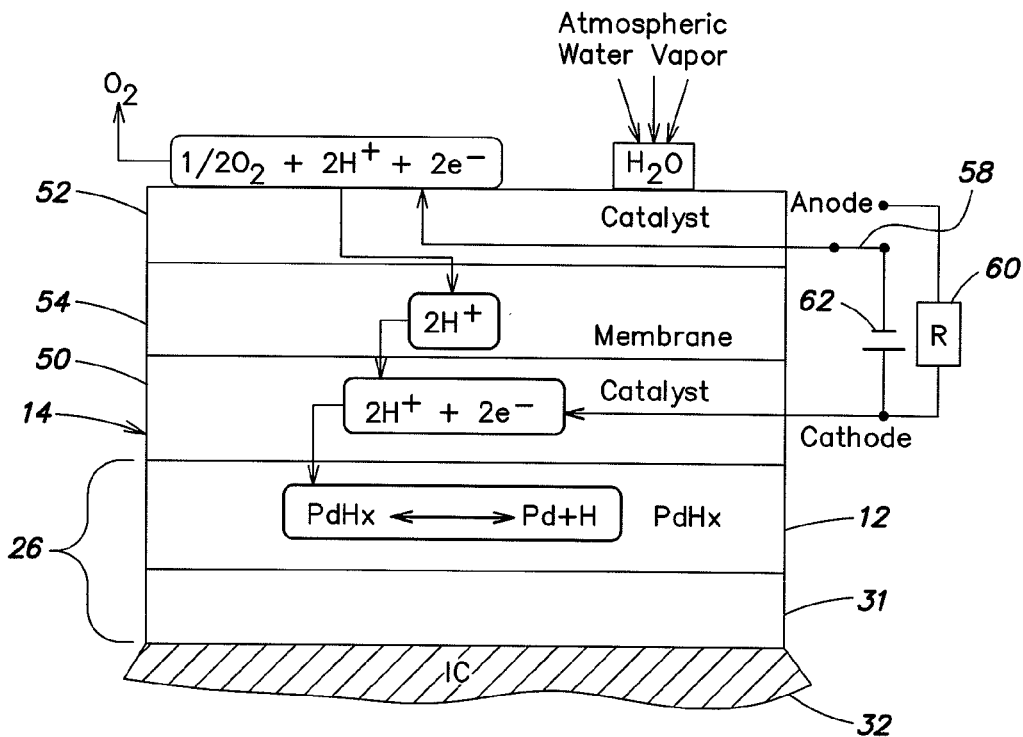

FIGS. 2A, 2B show another fuel cell system in two different switched states. Again illustrated is a layered arrangement of two electrodes 50, 52 and between them a catalytic and proton-permeable layer or membrane 54. One of the electrodes 52 is connected to the surrounding air, so that atmospheric oxygen $O_2$ and water $H_2O$ can be interchanged with the ambient air. The other electrode 50 in turn is located adjacent to a fuel supply device 12; this electrode and the fuel supply device can also be made as a single unit. The fuel supply device shown is preferably a palladium or palladium hydride reservoir for temporary storage of the fuel.

The embodiment has a layered structure that is applied directly on a silicon layer 31. The fuel supply device 12 is produced as a layer on the silicon layer or as a component of it. For example, as illustrated, the silicon layer 31 is at the same time a component of an integrated circuit IC 32, or is produced on one. A system is also possible in which the silicon layer 31 is made wider laterally as a substrate or component of a substrate, and laterally supports a switch 58 or an integrated switching system. The overall system can be produced by methods familiar for semiconductor production.

FIG. 2A shows a first switched state in which a load 60 is applied to the two electrodes 50, 52 through the switch 58.

The overall system thus serves as a fuel cell, with fuel being withdrawn from the fuel supply device 12.

FIG. 2B represents an alternative switched state of the switch 58. Instead of the load 60, the two electrodes 50, 52 are connected to a voltage source 62. The polarization here is such that the electrode 50 previously switched as an anode is now switched as a cathode. Accordingly, the electrode 52 previously switched as a cathode is switched as an anode. The applied voltage brings about the functioning of the system as an electrolysis cell. While fuel from the fuel supply device 12 in the first switched state (FIG. 2A) was converted electrochemically by atmospheric oxygen $O_2$ to water $H_2O$ as the combustion product, the opposite electrochemical process occurs in the second switched state (FIG. 2B). Using water $H_2O$, for example atmospheric water vapor from the environment, $O_2$, which is released to the surrounding air, and hydrogen, which is fed to the fuel supply device, are produced.

As shown in FIG. 1A, an electrolyte-catalyst unit was coupled to the back of a polymeric electrolyte membrane with integrated palladium hydride reservoir. However, in order to load the palladium hydride reservoir switched as a cathode with hydrogen electrochemically, according to the second embodiment (FIGS. 2A, 2B), a system with fewer layers is preferred. In the second embodiment, the polymeric electrolyte membrane serves as an ion conductor and water reservoir. During the electrochemical loading of the palladium hydride reservoir, the palladium hydride reservoir is switched as a cathode. The polymer membrane must have adequate thickness for reversible loading with hydrogen.

Figure 3:
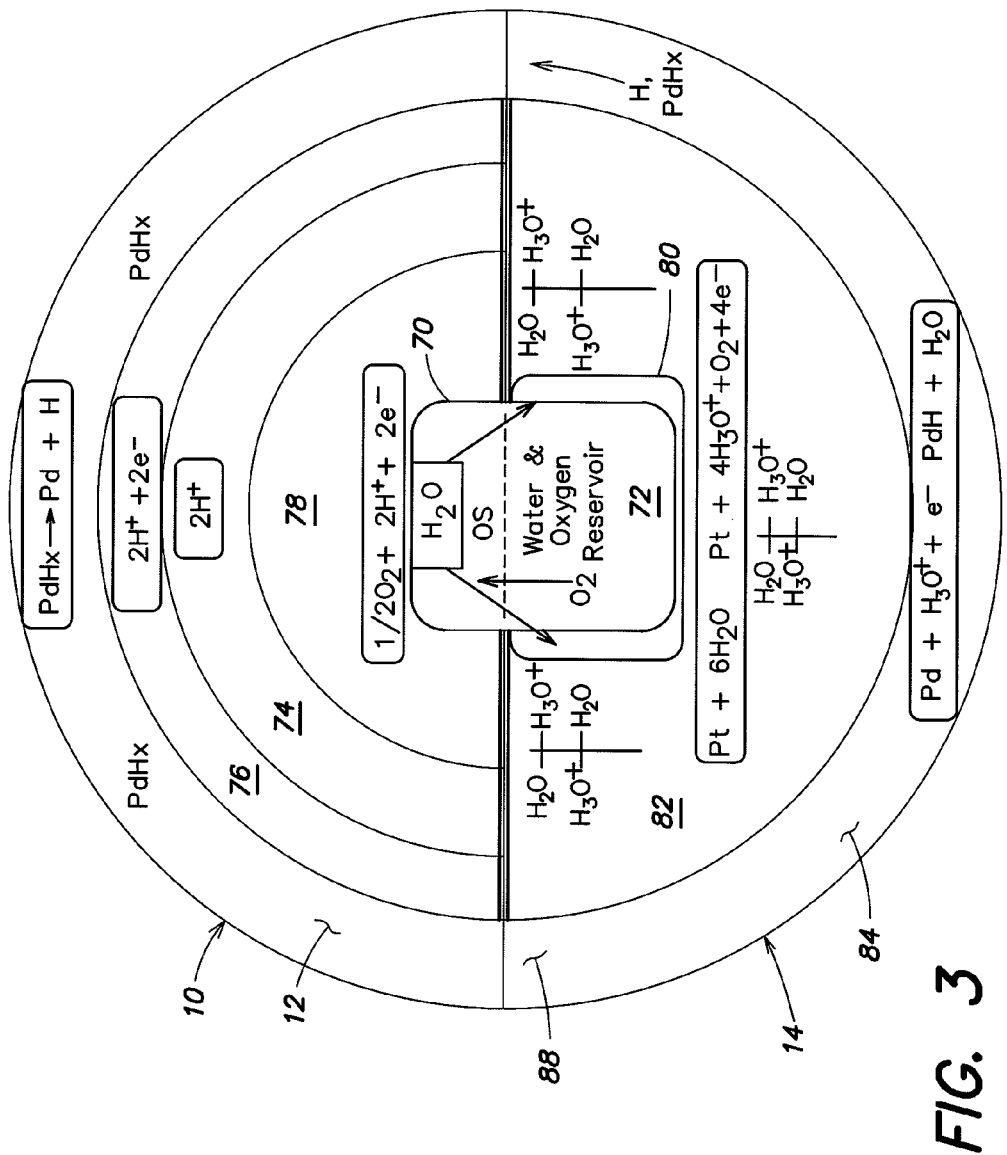
FIG. 3 shows another embodiment with a fuel cell system that has storage devices for the fuel, reactant, and combustion product in addition to a fuel cell and an electrolysis device.

FIG. 3 shows yet another embodiment of a fuel cell system, which performs the functions of both a fuel cell and an electrolysis cell. Besides the illustrated and preferred cylindrically symmetrical structural arrangement of the two main components, differently formed arrangements can also be used. This fuel cell arrangement operates like a fuel cell storage battery in the form of ordinary standard batteries. By providing multiple storage devices autonomous operation is made possible independently of the interchange of combustion materials with the environment.

In the example of the third exemplary embodiment illustrated in FIG. 3, the fuel cell system has a central storage device 70, 72.

In addition to the possibility of making a single storage device, a subdivided storage device, or one subdivided into two storage devices 70, 72 is preferred. The first of these storage devices 70 is adjacent to the fuel cell and constitutes a hydrophobic region with a hydrophobic material. This causes the water $H_2O$ given off by the fuel cell to be led to the adjacent storage device 72 in an accelerated manner. The adjacent second storage device is next to the electrolysis cell 14 and stores water $H_2O$, which is made available to the electrolysis cell EC for electrolysis.

The fuel cell 10, viewed from the central storage device 70, again comprises a proton-permeable layer or membrane 74 between two electrodes 76, 78, with the electrode facing the central storage device 70 being switched as the cathode and the other electrode switched as the anode. On the outside, the fuel cell is surrounded by a fuel supply device 12, preferably again a palladium or palladium hydride reservoir, to make fuel available. Thus fuel is supplied from the outside and the reactant $O_2$ is supplied from the inside for the operation of the fuel cell.

In the second half of the overall system there is the electrolysis cell 14, with the possibility of other spatial arrangements and subdivisions in particular with a view to space conditions. The electrolysis cell in the usual way comprises a central electrode 80 of the electrolysis unit 82, with the electrolyte, and another electrode 84 that in this case is made up of a fuel conduit. Water $H_2O$ made available in the storage device 72 as the starting material for electrolysis is converted by applying voltage to the two electrodes 80, 84, into oxygen $O_2$ and fuel. The oxygen $O_2$ is transported into the other storage region 70 in the interior of the fuel cell system and is available there for reaction in the fuel cell. The fuel produced is transported through the fuel conduit 88 to the fuel supply device 12. Designing the fuel supply device around the fuel cell and the electrolysis cell is also possible.

The fuel cell storage battery can be operated as an autonomous system. In contrast to the two embodiments described previously, the fuel cell is not constructed as a self-breathing system that uses atmospheric oxygen from the environment for hydrogen combustion. In this third embodiment, the oxygen needed for combustion is stored inside the preferably cylindrically shaped system. When the oxygen is completely or partially consumed, the system is loaded again electrochemically. In this case, water is decomposed into hydrogen and oxygen in the cylindrical interior of the electrolysis cell, with the oxygen being stored inside the cylinder. The hydrogen is distributed by diffusion in the palladium of the fuel supply device and is fed to the fuel cell. The stored oxygen and hydrogen are reacted during the fuel cell reaction to form water. This water is carried away to the interior of the cylinder and can be decomposed again into oxygen and hydrogen when the storage battery is loaded.

The components of the fuel cell and the electrolyte-catalyst unit may be placed opposite one another inside a palladium tube. It is thus an autonomous system to which only a voltage has to be applied for loading, in order to be able to tap current or voltage as needed. In contrast to this, the first two embodiments depend on an electrolysis cell that is connected to a water supply, with water being fed in through a line and being distributed by capillary forces, or that is of hygroscopic design and passively loads itself from the atmospheric moisture in its environment.

The method of electrochemical loading of hydrogen thus makes possible the construction of a fuel cell storage battery and thus opens up the potential of making available a reloadable chip-integrated fuel cell for small portable electrical equipment with a self-contained energy supply. In the described systems in an acidic electrolyte, palladium is advantageously switched directly as a cathode, so that hydrogen formed on the surface is absorbed and is distributed in the palladium hydride reservoir by diffusion. The electrolyte is chosen to contain hydronium ions and water in sufficiently large amounts and with sufficient mobility. Examples of electrolyte materials used are hydrogels, further developed polymeric electrolyte membranes, or acids or alkalis, which are stored in high-porosity ceramics, for example.

Figure 4:
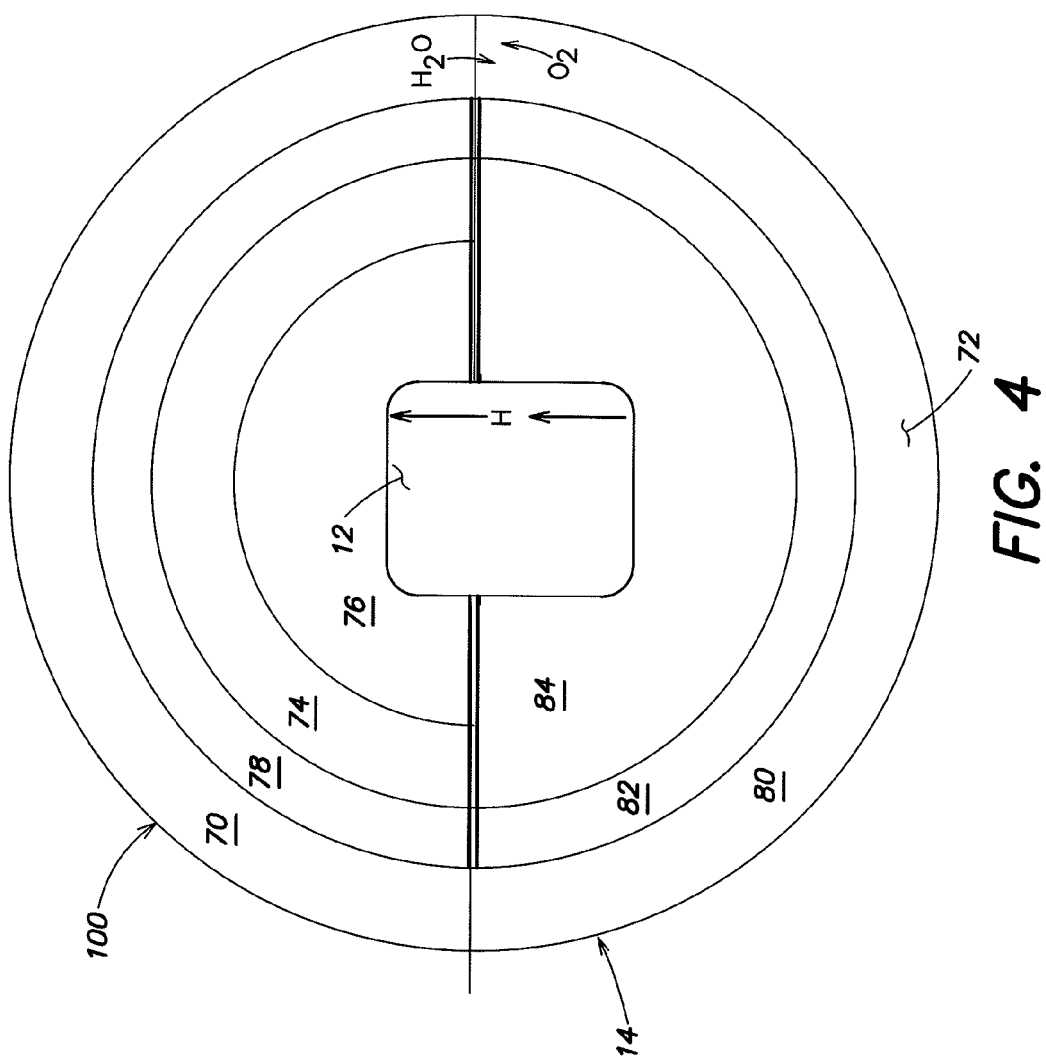
FIG. 4 shows another form of the embodiment illustrated in FIG. 3.

FIG. 4 shows yet another fuel cell system 100. Basically, its structure is similar to the previously described embodiment. However, the two storage devices 70, 72 for the oxygen as reactant and for water as the starting material for electrolysis are located in the circumferential region of the fuel cell 10 and of the electrolysis cell 14. The reservoir for the hydrogen used as fuel is in the central inner space. Accordingly, the circuitry for the electrodes 76, 78, 80, 84 is opposite to the circuitry of the previously described embodiment. In this embodiment the fuel is fed in and supplied centrally, and thus is available as quickly as possible for the fuel cell 100 after it is produced in the electrolysis cell 14.

Although the present invention has been shown and described with respect to several preferred embodiments thereof, various changes, omissions and additions to the form and detail thereof, may be made therein, without departing from the spirit and scope of the invention.

What is claimed is:

1. A fuel cell system, comprising:
    a fuel cell located on a semiconductor substrate and including
        (i) a first electrode and a second electrode, one of which is formed as a cathode and the other as an anode;
        (ii) a layer permeable at least to protons with catalytic activity;
    a fuel supply device that provides fuel to one of the electrodes;
    a reactant supply device for the infeed of a reactant that reacts with protons from the fuel, where the reactant supply device is located on a face of one of the electrodes; and
    a fuel infeed device, connected to the fuel supply device for the infeed of fuel to one of the electrodes, where the fuel supply device comprises one of the electrodes or a layer adjacent to one of the electrodes, and where the fuel supply device comprises a storage device for the fuel.

2. The fuel cell system of claim 1, where the fuel infeed device and the fuel supply device are adjacent to one another and comprise an electrolysis cell.

3. The fuel cell system of claim 1, where the fuel supply device further comprises an electrode of an electrolysis cell that includes the fuel infeed device or is located directly adjacent to an electrode made from an electrolysis cell that includes the fuel infeed device.

4. The fuel cell system of claim 1, comprising integrated storage devices for a combustion product ($H_2O$), for the fuel (H), and for the reactant ($O_2$) as a closed system.

5. The fuel cell system of claim 4, where the storage devices for the reactant ($O_2$) and for the combustion product ($H_2O$) are connected to one another as a common container for the interchange and passage of the reactant and the combustion product.

6. The fuel cell system of claim 4, where the storage device for the reactant ($O_2$) is located adjacent to one of the electrodes of the fuel cell, and the storage device for the combustion product ($H_2O$) is located adjacent to an electrode of an electrolysis unit.

7. The fuel cell system of claim 6, in which the storage device for the reactant ($O_2$) presents a hydrophobic material and/or the storage device for the combustion product $H_2O$ presents a hydrophilic material.

8. The fuel cell system of claim 7, where the storage device for the fuel is located between the proton-permeable layer of the fuel cell and an electrolyte layer of an electrolysis unit and the other two storage devices surround the fuel cell and the electrolysis cell.

9. The fuel cell system of claim 7, in which the storage devices for the reactant ($O_2$) and for the combustion product ($H_2O$) are located between the proton-permeable layer of the fuel cell and an electrolyte layer of an electrolysis cell, and the other storage device surrounds the fuel cell and the electrolysis cell.

10. The fuel cell system of claim 9, where the entire system is of cylindrically symmetrical construction.

11. The fuel cell system of claim 1, comprising a switch for unloading or loading the fuel supply device, where the fuel infeed device loads the fuel supply device by reverse switching of the fuel cell such that the fuel supply device or one of the electrodes adjacent to the fuel supply device is switched as a cathode.

12. The fuel cell system of claim 1, where the fuel supply device is applied to a semiconductor layer as one of the electrodes or as a layer directly adjacent to one of the electrodes.

13. The fuel cell system of claim 1, in which the fuel infeed device comprises an electrolysis unit of an electrolysis cell to produce the fuel.

14. The fuel cell system of claim 1, in which the fuel supply device comprises a bonded material to which fuel is supplied.

15. The fuel cell system of claim 1, where the fuel supply device includes palladium and comprises one of a palladium reservoir and a palladium hydride reservoir.

16. The fuel cell system of claim 1, where the fuel supply device is dimensioned for autonomous operation of an integrated circuit.

17. The fuel cell system of claim 1, where the fuel infeed device includes a depot with algae or bacteria for producing the fuel.

* * * * *

UNITED STATES PATENT AND TRADEMARK OFFICE
CERTIFICATE OF CORRECTION

PATENT NO.          : 7,422,816 B2                                   Page 1 of 1
APPLICATION NO.     : 11/074594
DATED               : September 9, 2008
INVENTOR(S)         : Erdler et al.

It is certified that error appears in the above-identified patent and that said Letters Patent is hereby corrected as shown below:

<u>Column 4</u>
Line 64, delete "electrode 3" and insert --electrode 18--

<u>Column 5</u>
Line 21, delete "form" and insert --from--
Line 30, after "cell" insert --is--

Signed and Sealed this

Fourth Day of November, 2008

JON W. DUDAS
*Director of the United States Patent and Trademark Office*